United States Patent
Pribyl

(10) Patent No.: US 9,815,629 B1
(45) Date of Patent: Nov. 14, 2017

(54) METHOD AND SYSTEM FOR DISCHARGING SWARF FROM A CONVEYOR

(71) Applicant: Paul Pribyl, Mequon, WI (US)

(72) Inventor: Paul Pribyl, Mequon, WI (US)

(73) Assignee: JORGENSEN CONVEYORS, Mequon, WI (US)

( * ) Notice: Subject to any disclaimer, the term of this patent is extended or adjusted under 35 U.S.C. 154(b) by 98 days.

(21) Appl. No.: 14/684,583

(22) Filed: Apr. 13, 2015

Related U.S. Application Data

(60) Provisional application No. 62/003,633, filed on May 28, 2014.

(51) Int. Cl.
| | |
|---|---|
| *B65G 17/40* | (2006.01) |
| *B65G 17/08* | (2006.01) |
| *B65G 17/06* | (2006.01) |
| *B65G 45/22* | (2006.01) |

(52) U.S. Cl.
CPC ............ *B65G 17/40* (2013.01); *B65G 17/06* (2013.01); *B65G 17/08* (2013.01); *B65G 45/22* (2013.01)

(58) Field of Classification Search
CPC ........ B65G 17/06; B65G 17/08; B65G 17/40; B65G 45/22
USPC ..................................... 198/493, 844.1, 850
See application file for complete search history.

(56) References Cited

U.S. PATENT DOCUMENTS

| | | | | |
|---|---|---|---|---|
| 4,776,454 | A * | 10/1988 | Momose ........................ | 198/853 |
| 6,732,856 | B2 * | 5/2004 | Maine, Jr. ...................... | 198/850 |
| 6,763,936 | B2 * | 7/2004 | Marsetti et al. ............ | 198/844.1 |
| 7,360,643 | B1 * | 4/2008 | Fandella ........................ | 198/850 |
| 7,690,501 | B2 * | 4/2010 | Menke et al. ................ | 198/851 |
| 8,074,791 | B1 * | 12/2011 | Jager ............................. | 198/853 |
| 8,360,411 | B2 * | 1/2013 | Reynolds et al. ............ | 269/305 |

* cited by examiner

*Primary Examiner* — Leslie A Nicholson, III
(74) *Attorney, Agent, or Firm* — Quarles & Brady LLP

(57) ABSTRACT

A belt link for removing material from between the run and the return portions of a conveyor belt moving along a first trajectory. The belt link may include a first substantially planar plate member including first and second substantially parallel edges and first and second hinge knuckles at the first and second edges, respectively, the plate member forming at least a first pass through slot between the edges with the first hinge knuckle leading as the belt moves along the first trajectory. The belt link may further include a cleat including first and second rigid cleat members. The belt link may still further include a cap member extending between distal ends of the first and second cleat members to close off a cavity formed between the first and second rigid cleat members. The second cleat member may form at least one drain opening.

10 Claims, 3 Drawing Sheets

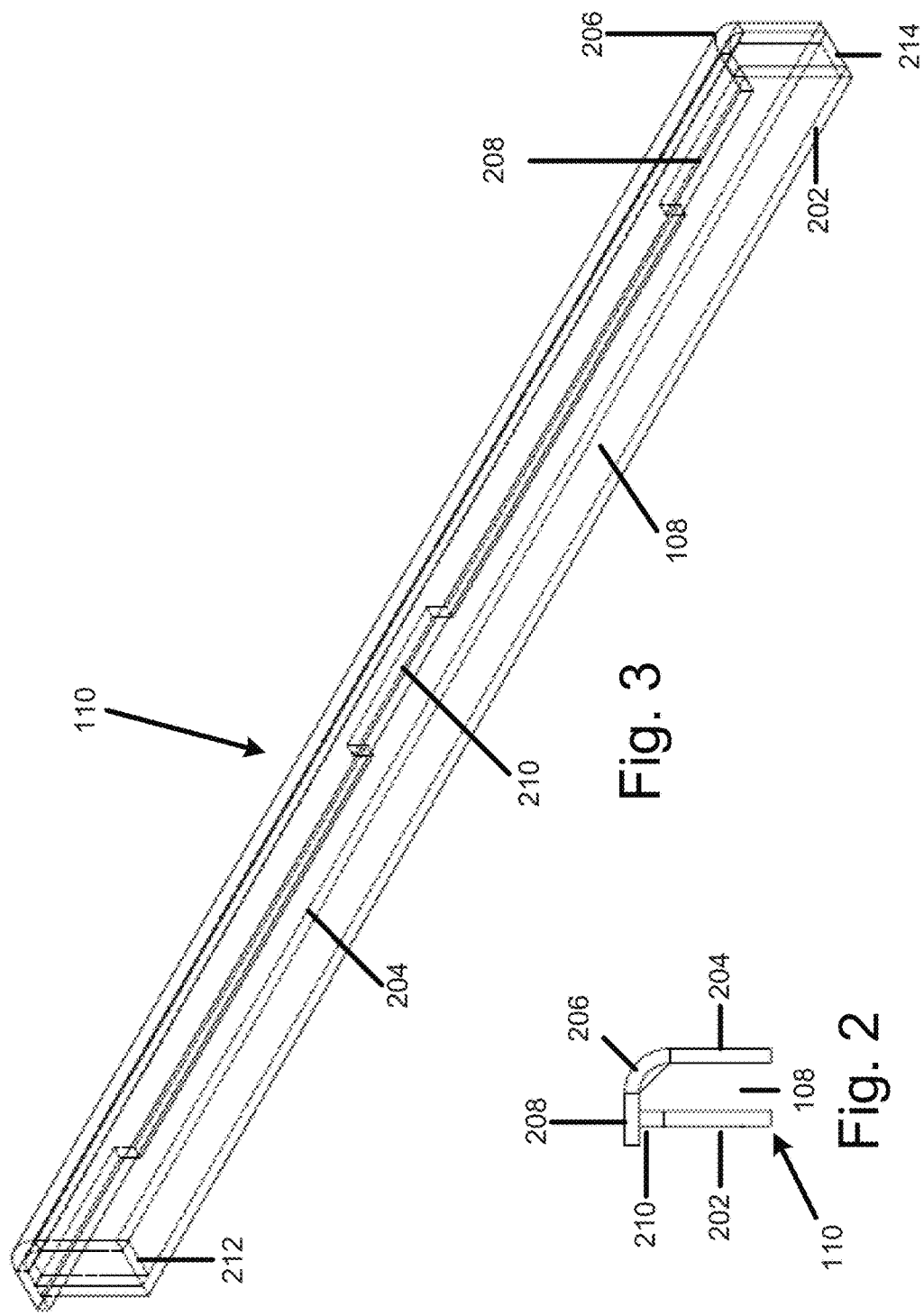

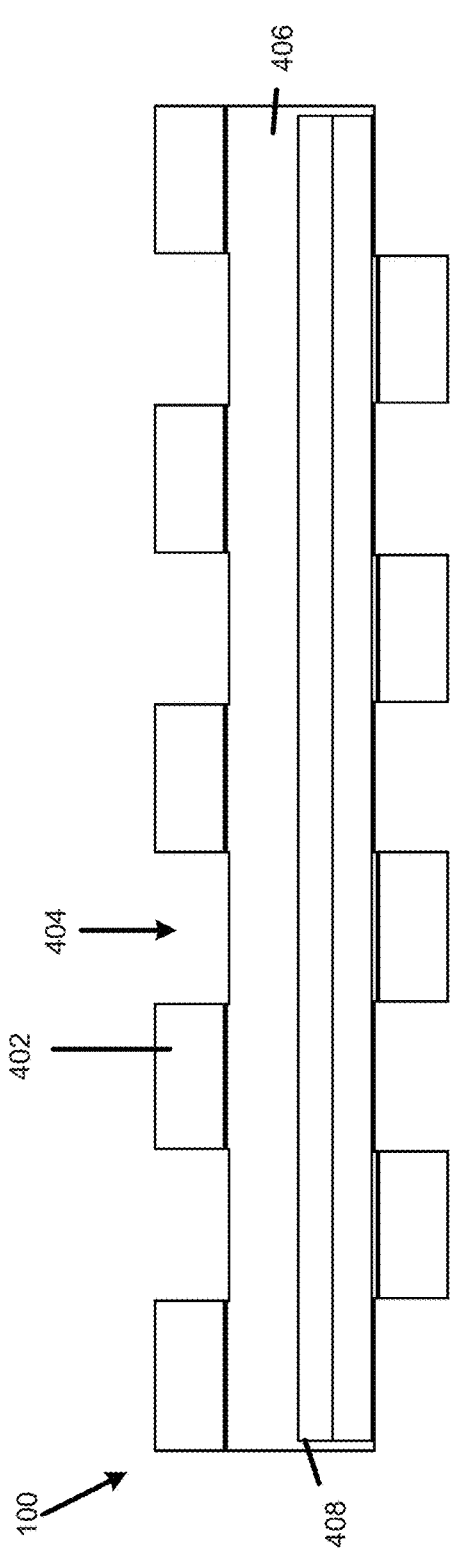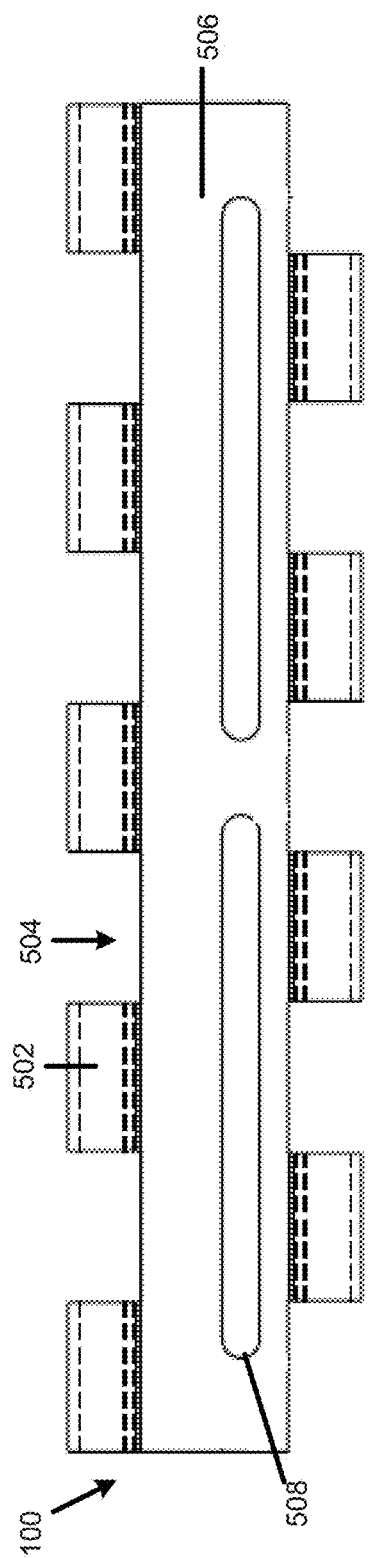

METHOD AND SYSTEM FOR DISCHARGING SWARF FROM A CONVEYOR

CROSS-REFERENCE TO RELATED APPLICATIONS

This application is based on U.S. Provisional Patent Application Ser. No. 62/003,633 filed on May 28, 2014 and entitled "METHOD AND SYSTEM FOR DISCHARGING SWARF FROM A CONVEYOR".

STATEMENT REGARDING FEDERALLY SPONSORED RESEARCH OR DEVELOPMENT

Not applicable.

BACKGROUND OF THE DISCLOSURE

The field of the invention is a system and method for cleaning swarf from a conveyor belt and more specifically a system and method for using a cleat connected to a conveyor belt link for cleaning swarf from between the run and return portions of a conveyor belt.

A variety of systems have been used for cleaning swarf from endless conveyor belts. These past systems are generally known as swarf discharging conveyor systems. The main goal of these systems is to clean as much swarf as possible from the conveyor and the lubricating liquid/coolant being used to lubricate/cool the conveyor. The systems usually include some sort of cleat or a hinged belt link that acts as a cleat to remove swarf from the conveyor and potentially push the swarf into a discharge container.

While these past swarf discharging conveyor systems have proven themselves useful, they have some shortcomings. First, they may not allow for different sizes of swan to be discharged. Second, they may not be able to effectively drain the lubricating liquid/coolant from the swan. Third, they may allow for swan to get wedged in the conveyor belt, specifically between the run and return portions of the conveyor belt. Therefore, there is a need for a more effective swan discharging conveyor system.

BRIEF SUMMARY OF THE DISCLOSURE

It has been recognized that a swarf discharging conveyor system can be provided that includes a belt link with a specially designed cleat that can discharge many different sizes of swarf, effectively drain the lubricating liquid/coolant in the conveyor belt from the swarf, and stop swarf from getting wedged in the conveyor belt.

In at least some embodiments, a belt link for removing material from between the run and the return portions of a conveyor belt moving along a first trajectory may be provided. The belt link may include a first substantially planar plate member including first and second substantially parallel edges and first and second hinge knuckles at the first and second edges, respectively, the plate member forming at least a first pass through slot between the edges with the first hinge knuckle leading as the belt moves along the first trajectory. The belt link may further include a cleat including first and second rigid cleat members, the first rigid cleat member connected to and extending from a location on the first substantially planar plate member between the pass through slot and the first hinge knuckle to a distal end and the second rigid cleat member connected to and extending from the first substantially planar plate member from a location between the pass through slot and the second hinge knuckle to a distal end. The belt link may still further include a cap member extending between the distal ends of the first and second cleat members to close off a cavity formed between the first and second rigid cleat members. The second cleat member may form at least one drain opening.

These and other objects, advantages, and aspects of the inventions will become apparent from the following description. In the description, reference is made to the accompanying drawings which form a part hereof and in which there is shown a preferred embodiment of the invention. Such embodiment does not necessarily represent the full scope of the invention, and reference is made, therefore, to the claims herein for interpreting the scope of the invention.

BRIEF DESCRIPTION OF THE SEVERAL VIEWS OF THE DRAWINGS

FIG. 2 is a perspective view of a configuration of a cleat for the swarf discharging conveyor system of FIG. 1;

FIG. 3 is cross-sectional view of the configuration of the cleat of FIG. 2;

FIG. 4 is a front elevation view of a configuration of the swarf discharging conveyor system of FIG. 1; and FIG. 5 is a front elevation view of another configuration of the swarf discharging conveyor system of FIG. 1.

DETAILED DESCRIPTION OF THE DISCLOSURE

Figure 1:
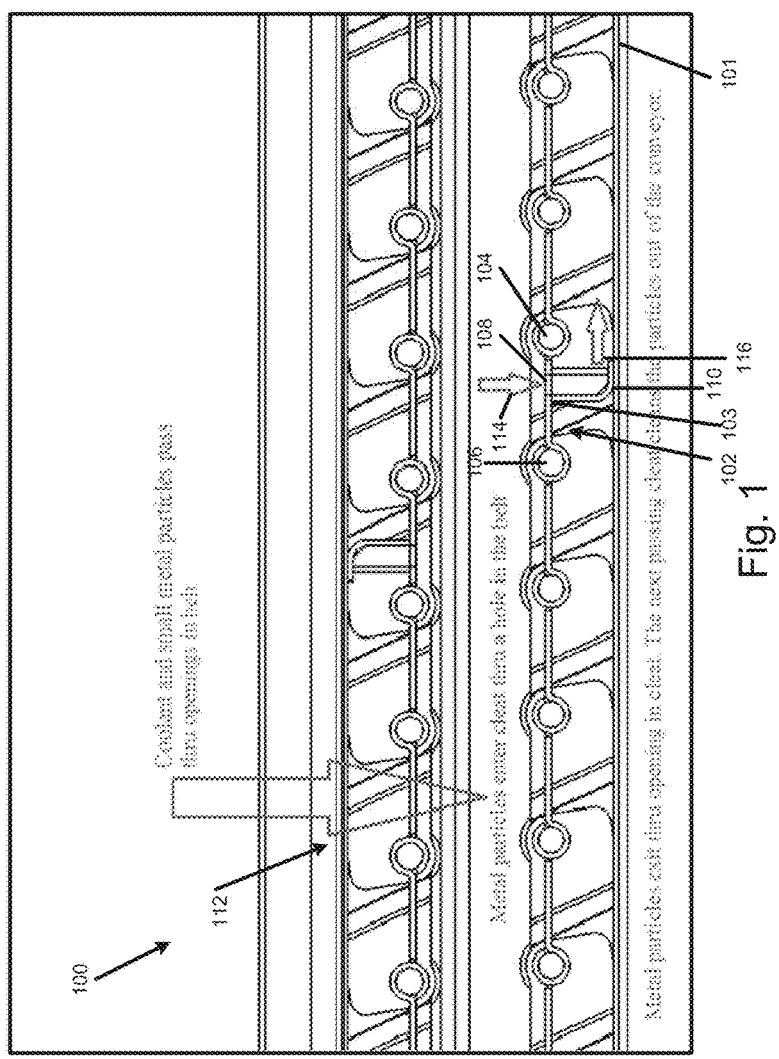
FIG. 1 is a perspective view of a swarf discharging conveyor system.

The various aspects of the subject disclosure are now described with reference the drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

The word "exemplary" is used herein to mean serving as an example, instance, or illustration. Any aspect or design described herein as "exemplary" is not necessarily to be construed as preferred or advantageous over other aspects or designs. Of course, those skilled in the art will recognize many modifications may be made to this configuration without departing from the scope or spirit of the claimed subject matter.

Referring now to the drawings wherein like reference numerals correspond to similar elements throughout the several views and more specifically, referring to FIG. 1, the present disclosure will be described in the context of an exemplary swarf discharging conveyor system 100. The swarf discharging conveyor system 100 has a conveyor 101 with a belt link 102 that includes a substantially planar plate member 103. On either end of the plate member 103 are two hinge knuckles 104, 106. A pass through slot 108 is formed between the ends of the plate member 103. Extending from the slot 108 is a cleat 110, which will be described more in reference to FIG. 2. The swarf and lubricating liquid/coolant may pass through openings 112 in the conveyer 101. The swarf and lubricating liquid/coolant may then enter the cleat 110 through slot 108 via direction 114. The conveyor 101 may move in a first trajectory 116 such that the cleat 110 moves with the conveyor 101 on the first trajectory 116 to discharge swarf from the conveyor 101.

The swarf discharge conveyor system 100 may include a plurality of belt links with cleats as described above. In some embodiments, the belt links may be hinged and gravity or cam actuated. In some embodiments, sliding doors that are gravity or cam actuated may be utilized. In some embodiments, perforated screen or mesh may be used.

Referring now to FIGS. 2 and 3, the configuration of the cleat 110 will be described in more detail. The cleat 110 has first and second rigid cleat members 202, 204, with the first rigid cleat member 202 being connected to the plate member 103 between the hinge knuckle 104 and the pass through slot 108 and the second rigid cleat member being connected to the plate member 103 between the hinge knuckle 106 and the pass through slot 108. Extending from the second rigid cleat member 204 is a curved intermediate portion 206. Extending from the curved intermediate portion 206 is a cap member 208 such that there is at least one drain opening 210 formed between the first rigid cleat member 202 and the cap member 208. The cleat 110 also includes end wall members 212, 214 to substantially close off the cavity between the first and second rigid cleat members 202, 204. The cleat 110 may be constructed out of, for example, metal or plastic.

Referring now to FIGS. 4 and 5, two configurations for the swarf discharge conveyor system 100 are shown. Referring specifically to FIG. 4, the swarf discharge conveyor system 100 includes a plurality of conveyor belt members such as conveyor belt member 402 and a plurality of conveyor belt slots such as conveyor belt slot 404. The swarf discharge conveyor system 100 also includes a drainage plate 406 having a drainage slot 408 that is substantially rectangular in shape and extends most of the drainage plate 406.

Referring to FIG. 5, the swarf discharge conveyor system 100 includes a plurality of conveyor belt members such as conveyor belt member 502 and a plurality of conveyor belt slots such as conveyor belt slot 504. The swarf discharge conveyor system 100 also includes a drainage plate 506 having drainage slots 508 that are substantially oval in shape.

The belt members 402, 502 may be made of single- or multi-ply rubber belting, plastic that is hinged or non-hinged, or metal such as solid steel band or perforated band.

While the invention may be susceptible to various modifications and alternative forms, specific embodiments have been shown by way of example in the drawings and have been described in detail herein. However, it should be understood that the invention is not intended to be limited to the particular forms disclosed.

Thus, the invention is to cover all modifications, equivalents, and alternatives falling within the spirit and scope of the invention as defined by the following appended claims.

To apprise the public of the scope of this invention, the following claims are made:

What is claimed is:

1. A belt link for removing material from between the run and the return portions of a conveyor belt, the belt link to be used in a conveyor belt that moves along a first trajectory, the belt link comprising:
   a first substantially planar plate member including first and second substantially parallel edges and first and second hinge knuckles at the first and second edges, respectively, the plate member forming at least a first pass through slot between the edges with the first hinge knuckle leading as the belt moves along the first trajectory;
   a cleat including first and second rigid cleat members, the first rigid cleat member connected to and extending from a location on the first substantially planar plate member between the pass through slot and the first hinge knuckle to a distal end and the second rigid cleat member connected to and extending from the first substantially planar plate member from a location between the pass through slot and the second hinge knuckle to a distal end; and
   a cap member extending between the distal ends of the first and second cleat members to close off a cavity formed between the first and second rigid cleat members;
   wherein the second cleat member forms at least one drain opening.

2. The belt link of claim 1 wherein the first and second rigid cleat members are substantially parallel.

3. The belt link of claim 1 wherein the second rigid cleat member includes a flat plate portion proximate the first substantially planar plate member that extends at a substantially 90-degree angle from the first substantially planar plate member and curved intermediate portion and wherein the cap member includes a flat plate member that extends from an edge of the curved intermediate portion opposite the flat plate portion to the distal end of the first rigid cleat member.

4. The belt link of claim 3 wherein the at least one drain opening is formed proximate the distal end of the first rigid cleat member.

5. The belt link of claim 4 wherein each of the first and second rigid cleat members includes opposite first and second ends, the belt link further including first and second end wall members that substantially close off the cavity between the first and second rigid cleat members at the first and second ends, respectively.

6. The belt link of claim 4 wherein the at least one drain opening includes at least one slot.

7. The belt link of claim 4 wherein the cleat is welded to the first substantially planar plate.

8. The belt link of claim 3 wherein the flat plate portion and the first rigid cleat member are substantially parallel.

9. The belt link of claim 8 wherein the link is formed of metal.

10. A conveyor belt comprising:
   a first belt link and plurality of additional belt links linked to the first belt link,
   the first belt link comprising:
      a first substantially planar plate member including first and second substantially parallel edges and first and second hinge knuckles at the first and second edges, respectively, the plate member forming at least a first pass through slot between the edges with the first hinge knuckle leading as the belt moves along the first trajectory;
      a cleat including first and second rigid cleat members, the first rigid cleat member connected to and extending from a location on the first substantially planar plate member between the pass through slot and the first hinge knuckle to a distal end and the second rigid cleat member connected to and extending from the first substantially planar plate member from a location between the pass through slot and the second hinge knuckle to a distal end; and
      a cap member extending between the distal ends of the first and second cleat members to close off a cavity formed between the first and second rigid cleat members;
      wherein the second cleat member forms at least one drain opening, and wherein at least a subset of the plurality of additional belt links have a same configuration as the belt link.

* * * * *

UNITED STATES PATENT AND TRADEMARK OFFICE
CERTIFICATE OF CORRECTION

PATENT NO. : 9,815,629 B1
APPLICATION NO. : 14/684583
DATED : November 14, 2017
INVENTOR(S) : Paul Pribyl Page 1 of 1

It is certified that error appears in the above-identified patent and that said Letters Patent is hereby corrected as shown below:

In the Specification

Column 1, Line 36, "swan" should be --swarf--.

Column 1, Line 38, "swan" should be --swarf--.

Column 1, Line 39, "swan" should be --swarf--.

Column 1, Line 42, "swan" should be --swarf--.

Signed and Sealed this
Nineteenth Day of February, 2019

Andrei Iancu
*Director of the United States Patent and Trademark Office*